M. M. DICKINSON.
CULINARY UTENSIL.
APPLICATION FILED DEC. 7, 1916.
1,237,622.
Patented Aug. 21, 1917.
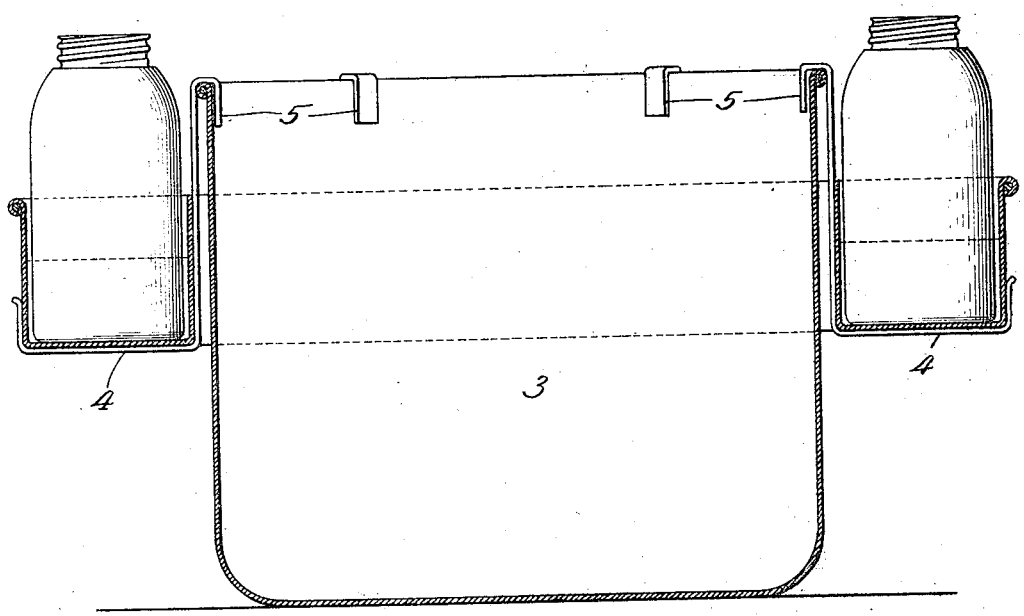
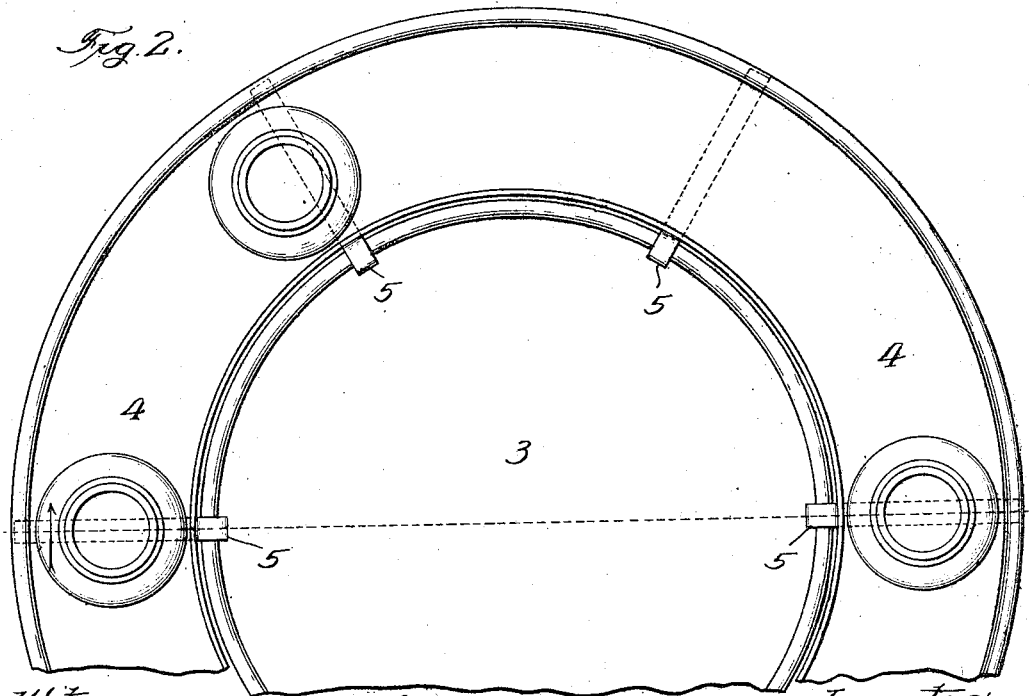
Witnesses:
Inventor:
Minnie M. Dickinson
By Dyrenforth, Lee, Chritton and Wiles
Attys.

UNITED STATES PATENT OFFICE.

MINNIE M. DICKINSON, OF EVANSTON, ILLINOIS.

CULINARY UTENSIL.

1,237,622. Specification of Letters Patent. Patented Aug. 21, 1917.

Application filed December 7, 1916. Serial No. 135,595.

*To all whom it may concern:*

Be it known that I, MINNIE M. DICKINSON, a citizen of the United States, residing at Evanston, in the county of Cook and State of Illinois, have invented a new and useful Improvement in Culinary Utensils, of which the following is a specification.

My invention relates to certain new and useful improvements in culinary utensils and is fully described and explained in the specification and shown in the accompanying drawings, in which—

Figure 1 is a vertical section on the line 1 of Fig. 2, showing my improved device in use; and Fig. 2 is a partial plan view of the device.

Referring to the drawings, 3 is a kettle, which may be of any form commonly in use. Surrounding this kettle is an annular trough 4, open at the top and of the proper width to hold a Mason-jar in an upright position, as shown in the drawings. This trough is preferably made separate from the kettle and is secured thereto by hooks 5, which hook over the upper edge or rim of the kettle. In this way the annular trough may be removed from the kettle and may be sold as a separate utensil, although it is entirely obvious that permanent connection may be made between the kettle and trough. The present utensil is primarily designed for preserving fruits, vegetables or like products, which are ordinarily poured into glass jars. In order to prevent the glass from breaking from the violent expansion caused by pouring in the hot material it is common practice to set the Mason-jars in a pan or tray of hot water. My utensil provides a peculiarly simple and convenient means of attaining the same end. During the cooking operation, which is carried on in the kettle, the trough is supplied with water and the Mason-jars are set therein. The waste heat ascending around the kettle heats the water to an adequate temperature and as a result, when the cooking is completed, the Mason-jars have been brought to the proper temperature to receive their contents without danger of breaking. Furthermore, the jars are in very close proximity to the kettle, so that in ladling out the material there is little danger of spilling it, and if any be spilled the trough is in such close proximity to the kettle around its whole periphery as to catch any spilled material.

I realize that considerable variation is possible in the details of the construction herein shown, and I do not intend to limit myself thereto, except as pointed out in the following claim, in which it is my intention to claim all the novelty inherent in the device as broadly as is permitted by the state of the art.

What I claim as new and desire to secure by Letters Patent is:

In combination with a preserving kettle, an annular water-trough adapted to surround the same and rest below the top thereof whereby the water contained therein is heated by the waste heat passing upwardly around the sides of the kettle, and a plurality of removable hooks engaging the top of the rim of the kettle and passing under said trough to support the same in operative position, said trough being adapted to receive and support ordinary fruit jars.

In testimony whereof I have hereunto set my hand and seal this 27th day of November, 1916.

MINNIE M. DICKINSON.

Copies of this patent may be obtained for five cents each, by addressing the "Commissioner of Patents, Washington, D. C."